Figure 2:
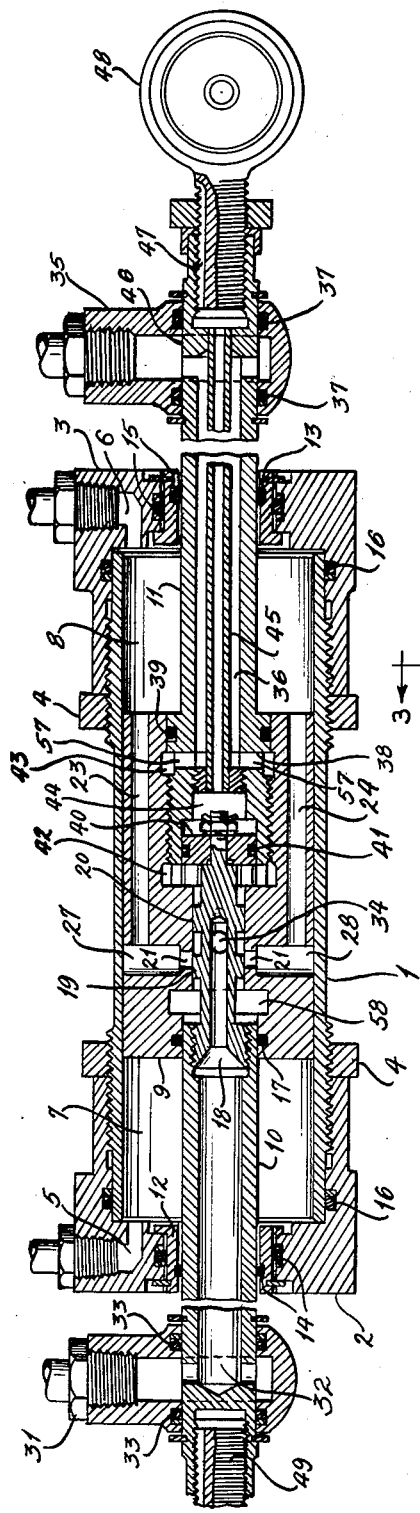

June 15, 1954    D. W. IRWIN    2,681,043
HYDRAULIC POWER SERVOMOTOR CONTROL
Filed Dec. 30, 1949    4 Sheets-Sheet 1

INVENTOR:
Donald W. Irwin,
By Carr & Carr & Gravely
HIS ATTORNEYS.

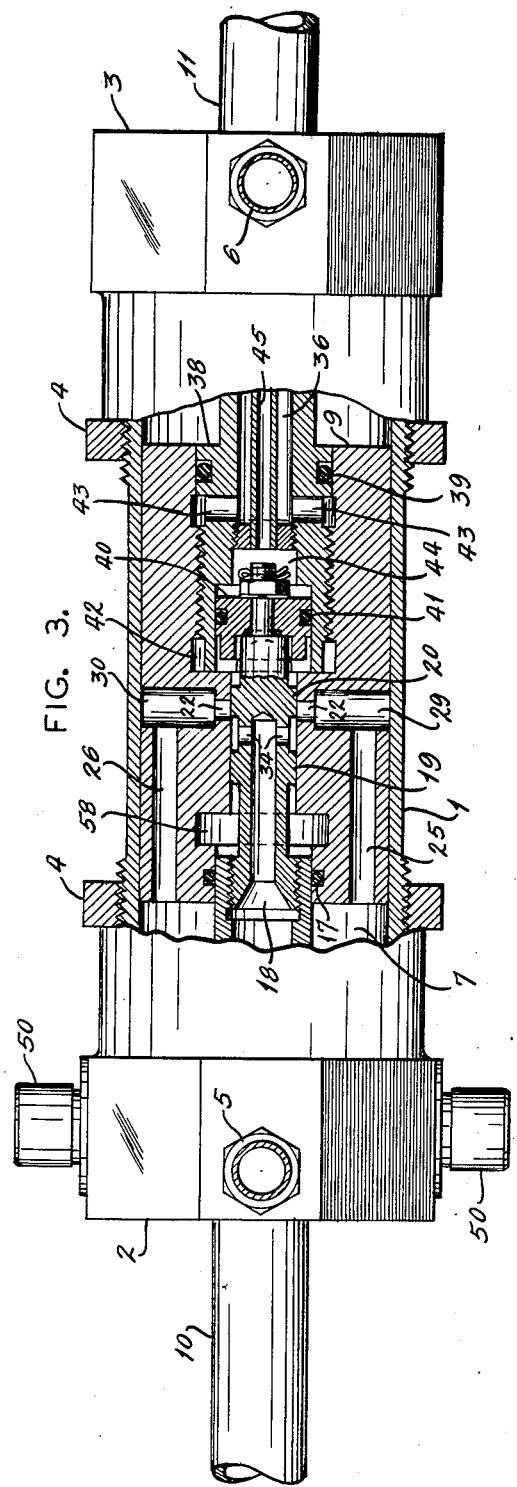

June 15, 1954 D. W. IRWIN 2,681,043
HYDRAULIC POWER SERVOMOTOR CONTROL
Filed Dec. 30, 1949 4 Sheets-Sheet 3
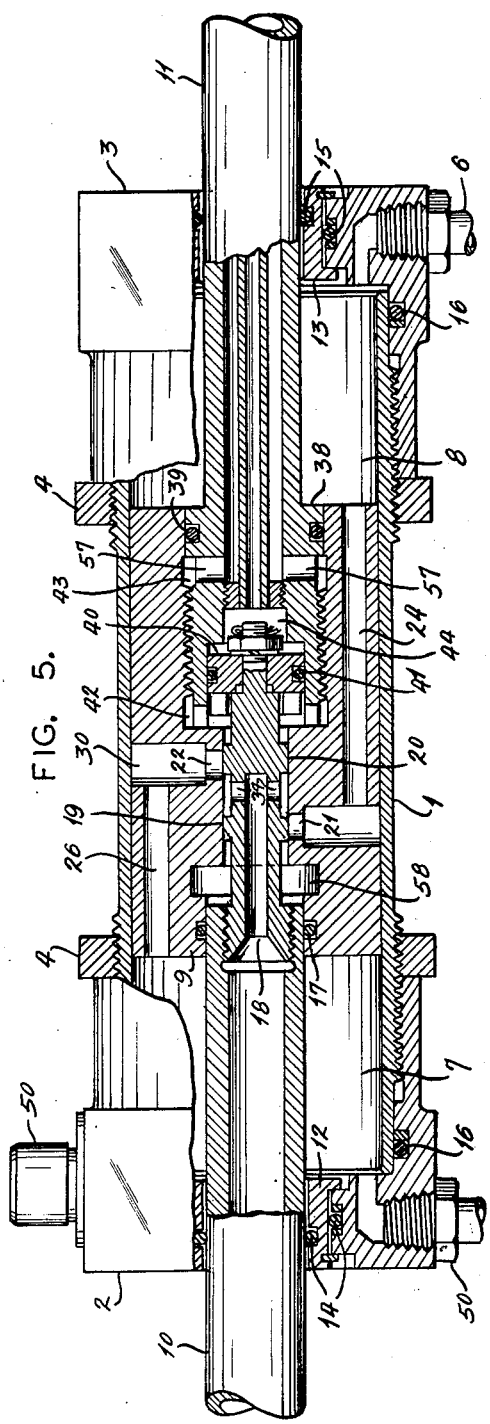
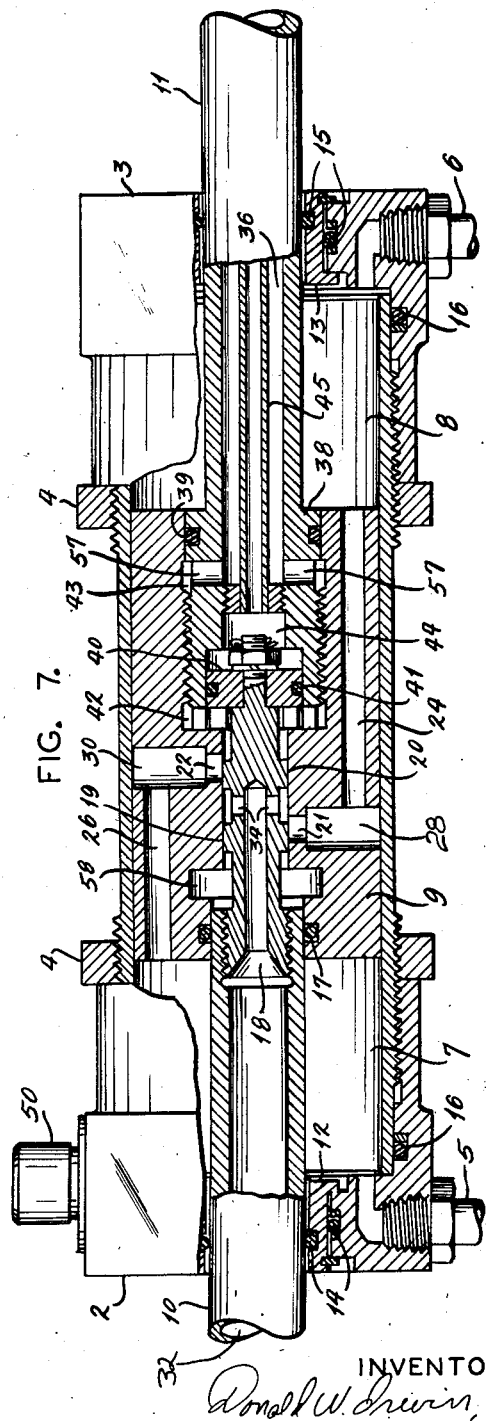
INVENTOR:
Donald W. Irwin,
By Carr＆Carr＆Gravely
HIS ATTORNEYS.

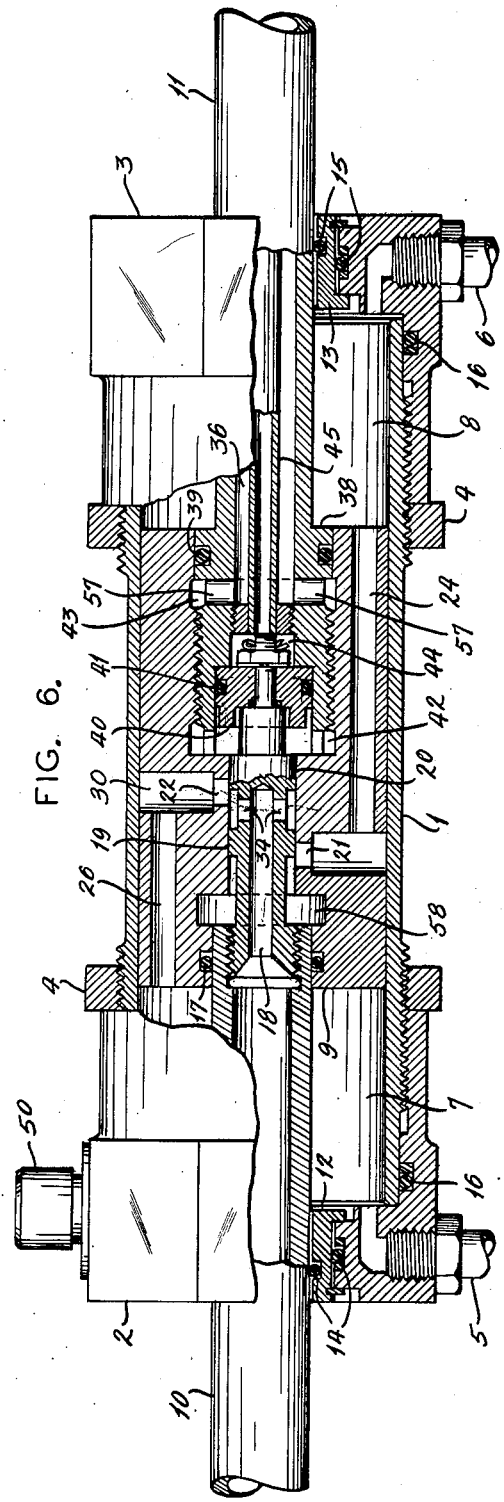

Patented June 15, 1954

2,681,043

UNITED STATES PATENT OFFICE 2,681,043

HYDRAULIC POWER SERVOMOTOR CONTROL

Donald W. Irwin, Ferguson, Mo., assignor to McDonnell Aircraft Corporation, St. Louis, Mo., a corporation of Maryland Application December 30, 1949, Serial No. 135,875

10 Claims. (Cl. 121—41)

This invention relates to fluid pressure operated motors for adjusting control surfaces on aircraft or for relatively moving one or more parts of a machine or other device in which a small amount of input force is used for controlling or regulating a large output force.

One of the objects of the invention is to provide a fluid pressure motor in which a reversing valve is disposed within the motor and is compensated or balanced, thereby causing a smoother and more uniform operation of the motor.

Another object of the invention is to provide a fluid pressure motor having a reversing valve that is vented to atmosphere through the piston rod.

A further object of the invention is to provide a floating bushing in a fluid pressure operated motor that will cause the motor to operate more smoothly.

Still another object of the invention is to provide a reciprocating fluid pressure operated motor in which the reversing valve is disposed within the piston and in which integral pressure operated valves are provided in by-pass passageways for controlling and directing the flow of the operating fluid from one end of the motor to the other in the event of pressure failure and manual operation is desired.

The invention consists in the provision of a fluid pressure operated motor having a reversing valve means disposed within the cylinder of the motor, the piston having compensating means therein, one side of which is vented to atmosphere through the piston rod in which the balancing of discharge and applied pressure fluids occurs between the compensating means and one of the reversing valve lands, or the valve control rod on another reversing valve land, thereby causing the valve and the motor to operate smoothly and uniformly.

This invention also consists in the provision of a floating bushing for the piston rod of a fluid pressure operated motor.

Figure 1:
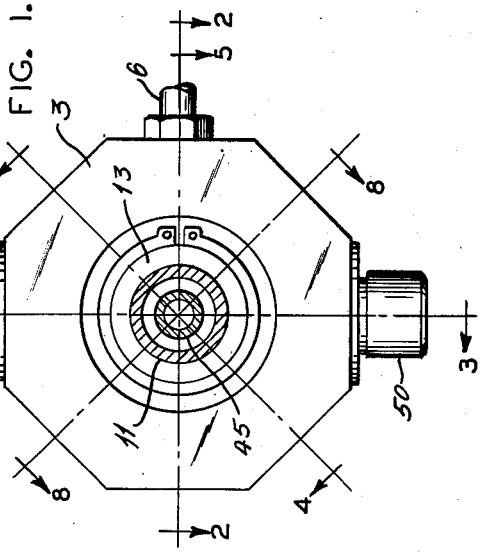

In the drawings:

Fig. 1 is an end view of the motor, the rod fittings being omitted,

Fg. 2 is a sectional view taken substantially along the line 2—2 of Fig. 1,

Fig. 3 is a sectional view taken substantially along the line 3—3 of Fig. 1,

Fig. 4 is a view of the fluid pressure motor showing the return flow passages adjusted for operating the motor in either direction and taken along the line 4—4 of Fig. 1, Fig. 5 is a sectional view taken substantially along the line 5—5 of Fig. 1 showing the reversing valve in neutral position, Fig. 6 is a view similar to Fig. 5 showing the reversing valve moved to the right, Fig. 7 is a view similar to Fig. 5 showing the reversing valve moved to the left; and Fig. 8 is a sectional view taken substantially along the line 8—8 of Fig. 1.

The invention is embodied in a device illustrated in the several views of the drawings in which the numeral 1 designates a cylinder casing for a fluid pressure motor having cylinder heads 2 and 3 threaded onto each end thereof, locknuts 4 being provided for locking the heads on the casing 1. Each of the heads 2 and 3 is provided with passageways 5 and 6 for connecting the chambers 7 and 8 with suitable devices for test purposes. These passageways are ordinarily closed by plugs (not shown) after testing is completed.

A piston 9 is slidable within the bore of cylinder 1. This piston is provided with a valve control rod 10 and a piston rod 11 extending through floating bushings 12 and 13, respectively, and disposed in heads 2 and 3. Pressure sealing rings 14, 14 are disposed between rod 10, bushing 12 and head 2, and pressure sealing rings 15 are similarly disposed between rod 11, bushing 13 and head 3 for preventing leakage of fluid pressure from chambers 7 and 8. Pressure sealing rings 16 prevent the escape of fluid pressure from the chambers between heads 2 and 3 and the cylinder casing 1.

The valve control rod 10 extends into a bore in piston 9 and a sealing ring 17 is disposed therebetween. A valve 18 is threaded into valve control rod 10 and provided with valve lands 19 and 20 cooperating with valve land apertures 21 and 22 cut in piston 9, the relative position of the lands and passageways determining the direction of fluid flow through the piston and, therefore, the direction of movement of piston 9 relative to the cylinder casing 1.

The piston is provided with a plurality of passageways 23, 24, 25 and 26 bored in the piston, thus preventing distortion of the cylinder casing by reason of the high pressure acting thereon as would be the case if the passageways were grooves cut in the piston surface. These passageways connect with radial passageways which selectively connect a source of fluid pressure supply to chambers 7 and 8, depending upon the relative position of valve 18 with respect to valve land openings 21 and 22. Fluid pressure is introduced into the motor by means of a fitting 31, the bore of which connects with a bore 32 in valve control rod 18, the fitting being provided with pressure sealing rings 33 for preventing the escape of pressure fluid between the fitting and the valve control rod. The bore 32 connects with the radial duct 34 connected with the space between lands 19 and 20, after which the pressure fluid is selectively directed to chambers 7 and 8.

The operating fluid is selectively exhausted from chambers 7 and 8 through a fitting 35 mounted on piston rod 11. The bore in fitting 35 connects with a bore 36 in the piston rod. Sealing rings 37 are disposed between the fitting 35 and piston rod 11 for preventing leakage of pressure fluid. The piston rod 11 is provided with a head 38 having a peripheral groove therein in which a sealing ring 39 is located that co-operates with a bore in piston 9. The left hand end of the piston rod 11 is threaded into the piston bore, said end of rod 11 being bored and slidably receiving compensating piston 40 provided with a sealing ring 41, the piston being secured to valve 18 for movement therewith. A chamber 42 is provided in piston 9 between land 20, compensating piston 40 and the left hand end of head 38; and a chamber 43 is formed in the piston between head 38 and the threaded end of piston rod 11 connecting with the bore 36 in the piston rod.

The compensating piston 40 in the bore in the end of piston rod 11 forms a chamber 44 therein and entrapped air escapes to atmosphere through a conduit 45 threaded into head 38. This conduit is also supported in a collar 46 formed in piston rod 11 and leads to atmosphere through a duct 47 in eye bolt 48 threaded into piston rod 11. An eye bolt 49 is threaded into the valve control rod 10, it being connected to a control lever in the cock pit or to a machine operator's control station. The eye bolt 48 is connected to a part to be moved relative to another. Inasmuch as the cylinder is rigidly mounted by trunnions 50, the movable element is the piston, although in some instances the cylinder may be moved with the piston held stationary.

The piston 9 is provided with a pair of passageways 51 (Fig. 8) extending through the piston parallel with its longitudinal axis. A pressure responsive valve 52, slidable in a bore 55, is actuated by pressure fluid and controls the closed position of the valves while a spring 53 returns them to open position in the event of pressure failure. The pressure fluid for operating valve 52 is derived from that present in the space between valve lands 19 and 20, there being suitable ducts 54 formed in piston 9 for connecting the space with the bore in which the valve is slidably mounted. The direction of movement of piston 9 relative to the cylinder casing 1 is dependent upon the position of valve lands 19 and 20 relative to valve land openings 21 and 22.

Communication between certain chambers in one end of the piston and the chambers in the other end of the piston is established through passages formed therein. Chamber 58 is in communication with chamber 42 through duct 56 and radial passages cut in the piston. An additional radial passageway is formed in the piston that establishes communication between chamber 43 and chamber 58. This structure is clearly illustrated in Figure 4.

It is assumed that the device is in the position illustrated in Fig. 5 which shows the neutral position of the reversing valve wherein means 18 and 34 are connected to means 21 and 22, while means 19 and 20 shut off chambers 58 and 42 from passages 23 to 26, and that the relative motion between piston 9 and the cylinder casing 1 is to be toward the left. The valve 18 will, therefore, be moved to the left such that valve land opening 21 will be in communication with the pressure fluid in the space between lands 19 and 20. The pressure fluid will now flow from bore 32 in the piston rod 11 into valve 18, through radial ducts 34, the space between lands 19 and 20, through valve land opening 21 into radial passageways 27 and 28 (Figs. 2 and 7) and passageways 23 and 24, thence into chamber 8. The admission of pressure fluid into the chamber 8 will continue to move piston 9 toward the left as long as land 20 is not positioned over opening 22. When valve land 20 covers opening 22 after the valve rod 10 is no longer manually actuated, the motion of piston 9 will stop since the return flow passages for the fluid in chamber 7 are closed. The fluid in chamber 7 is forced therefrom, by the motion of piston 9, through passageways 25 and 26 (Figs. 3, 4 and 7); through radial ducts 29 and 30; into the space about the right hand end of valve 18; and thence into chamber 42. This fluid also acts on the end of the compensating piston 40. The return fluid then enters ducts 56 that are in communication with chamber 43, passing through ducts 57 in the threaded end of the piston rod 11, into bore 36 and out through fitting 35. The extent and rate of movement is determined by the rate and amount of fluid forced out of chamber 7. Air for breathing is supplied to chamber 44 through conduit 45 and duct 47 because the compensating piston 40 is moved to the left in the bore.

Reverse or right hand relative movement of piston 9 and the cylinder casing 1 is initiated by moving the valve control rod 10 and attached valve 18 to the right, as shown in Fig. 6. This movement will connect the pressure fluid between valve lands 19 and 20 with valve land aperture 22 and with radial passageways 29 and 30 (Figs. 3 and 6), after which it will be conducted through passageways 25 and 26 into chamber 7. This will cause piston 9 to move to the right, thus shutting off the return flow and stopping movement of the piston after a given movement thereof. Fluid is exhausted from chamber 8, by the motion of piston 9, through passageways 23 and 24 (Fig. 2) and passes through aperture 21 into chamber 58, ducts 56 in the piston of chamber 43, ducts 57, bore 36 and fitting 35. Since the movement of valve 18 was to the right, air in chamber 44 will be exhausted to atmosphere through conduit 45 and duct 47. The rate and extent of movement of the piston 9 is controlled in the same manner as for the left hand movement. The piston 9 may be moved manually in cylinder 1 when the pressure fluid operated valve 52 has been opened upon release of fluid in the space between valve lands 19 and 20, spring 53 forcing it to open position. When these valves are open, fluid will flow freely through passageways 51 between chambers 7 and 8. As long as there is pressure fluid present in the system, valve 18 will hold and lock fluid in the end of the cylinder casing to which it has been directed.

The floating bushings 12 and 13 cause the fluid motor to operate more uniformly, thus eliminating the erratic motions characterizing prior construction.

The piston 9 is locked in position by having the entering pressure fluid applied to both ends thereof when the valve 18 is in neutral position, as shown in Fig. 5. The lands 19 and 20 are slightly smaller in length than the diameter of the apertures 21 and 22, thus permitting the fluid in the space between the lands to pass through the apertures. The locking is accomplished by moving the piston relative to the valve a few thousandths of an inch for relieving the pressure in one end of the cylinder and holding it in the other end thereof. After passing through aperture 21, pressure fluid enters passageways 25, 29 and 26, 30, and then to chamber 7, thus acting on the left hand end of piston 9. After passing through aperture 22, the pressure fluid enters passageways 23, 27 and 24, 28 and then to chamber 8, thus acting on the right hand end of piston 9 and locking the piston in neutral position. It should be understood that the piston 9 is only effectively locked against external forces when they are less than the pressure of the source of pressure fluid supply. When the external forces are greater, then they will cause movement of the control cylinder.

Movement of the piston 9 relative to cylinder casing 1 is controlled by regulating the rate at which the fluid in either of chambers 7 or 8 flows therefrom through return chamber 58, ducts 56, chambers 42 and 43, ducts 57, thence through passageway 36 and fitting 35. Regardless of the direction of movement of piston 9, the rate and extent of movement is dependent upon the amount and rate of fluid drawn from either of chambers 7 or 8, depending upon the adjusted position of valve 18. When the valve 18 is in neutral position, pressure balancing thereon is obviated by reason of the fact that lands 19 and 20 are so located on the valve that flow of pressure fluid into chambers 58 and 42 is prevented. The valve 18 is substantially balanced in its adjustment when set for right hand relative movement of piston 9 and the cylinder casing 1. The entering pressure fluid acts on lands 19 or 20 and the return pressure fluid acts on the end of rod 10. The area of the rod 10 and the effective area of lands 19 or 20 are so proportioned that there is a tendency for return of valve 18 to its normal position by reason of the return pressure fluid acting on rod 10. The valve 18 is also substantially balanced in its adjustment when set for left hand movement of piston 9 and the cylinder casing 1. The entering pressure fluid acts on lands 19 and 20 and the return pressure fluid acts on the compensating piston 40 whose effective area is equal to the effective area of rod 10. The effective areas of lands 19 and 20 and the piston 40 are so proportioned that there is a tendency for return of valve 18 to its neutral position by reason of the return pressure fluid acting on compensating piston 40. The manual force moving the valve 18 is opposed by the force created by the return pressure fluid acting on piston 40 or rod 10 in either direction of relative motion of piston 9 and cylinder 1, thus tending to move valve 18 to its neutral position.

Reverse movement of piston rod 11 by an external force acting thereon is resisted by the necessity of moving piston 9 relative to valve 18. This tends to drop the pressure on the return side of the circuit, thus holding the incoming fluid on the input side of the circuit. The piston 9 effectively prevents the external force moving it unless said force is of such magnitude as to overcome the force applied to the piston by the incoming pressure fluid. The force tending to restore the valve to neutral position is produced in the following manner: the effective area of the passageway through chambers 58 and 42 has a smaller cross-sectional area than the effective area of ducts 56, 57 and chamber 43. Therefore when the valve 18 is moved to the right, the return flow through passageway 24, aperture 21, to chamber 58 creates a "back pressure" in chamber 58 by reason of the restricting effect of the passage of fluid through chamber 58 to the duct 56, thus working on or being applied to the larger effective area of the control rod 10 extending into the chamber 58 over the effective area of the valve land 19, thereby producing a force tending to return the valve to neutral position. Because of this restricting effect the back pressure built up in chamber 58 is higher than the pressure built up in chamber 42 even though they are interconnected. Ducts 56 and 57 having a larger effective area than the passage from chamber 58 to duct 56 allows a free flow of fluid to the bore 36.

Movement of the valve 18 to the left creates the same restoring force in the chamber 42 in the same manner as described for the several passageways and ducts as described above in connection with chamber 58. Thus during movement or under dynamic conditions of flow, there is always a force tending to restore the valve 18 to neutral.

What I claim is:

1. A fluid pressure operated device comprising a cylinder, a piston in said cylinder for forming two chambers therein, a valve control rod extending through one end of said cylinder and having a bore therein for conducting pressure fluid into said piston, the end of said rod extending into said piston responsive to exhaust fluid pressure, a piston rod connected to said piston and extending through the other end of said cylinder, said piston rod having a bore therein for conducting exhaust pressure fluid away from said piston, a reversing valve connected to said valve control rod for directing the flow of pressure fluid to and from said chambers and movable in said piston by a manual force; and means on said valve having an area substantially equal to the effective area of said valve control rod acted upon by exhaust pressure fluid and located in said piston for substantially balancing the force created by the exhaust pressure fluid against said manual force.

2. A fluid pressure operated device comprising a cylinder, a piston in said cylinder for forming two chambers therein, a valve control rod extending through one end of said cylinder and having a bore therein for conducting pressure fluid into said piston, a piston rod connected to said piston and extending through the other end of said cylinder, said piston rod having a bore therein for conducting exhaust pressure fluid away from said piston, a reversing valve connected to said valve control rod for directing the flow of pressure fluid to and from said chambers and when in neutral position directing the fluid into both of said chambers and movable in said piston by a manual force; and means on said valve and in said piston for causing the force created by the exhaust pressure fluid to be placed in opposition to the manual force applied to said valve in a manner so that the valve will have a tendency to be moved to neutral position when the intake fluid is selectively directed into either of said chambers.

3. A fluid pressure operated device comprising a cylinder, a piston in said cylinder and having a bore therein, a head for each end of said cylinder, a valve control rod and a piston rod connected to opposite ends of said piston and extending through the head on each end of said cylinder, the control rod having an area on which exhaust pressure fluid is effective, a reversing valve in said bore and connected to said valve control rod for selectively directing the intake pressure fluid to either side of said piston and for directing exhaust pressure fluid from said cylinder, said valve movable by a manually applied force, a piston connected to said valve having an effective area substantially equal to the effective area of said control rod, and movable in said piston bore and acted on by exhaust pressure fluid, means for venting air into and from said bore as said valve mounted piston is moved therein; and means for placing the force created by the exhaust pressure fluid in opposition to the manually applied force and being proportioned for moving the valve to neutral position when directing the intake pressure fluid to either end of said cylinder.

4. A fluid pressure operated device comprising a cylinder, a piston in said cylinder provided with pressure fluid passageways, a valve bore and a cylinder bore therein, a head for each end of said cylinder, a floating bushing in each head, a rod extending through each bushing one rod being connected to said piston, a reversing valve in said valve bore and connected to the other of said rods and cooperating with the passageways formed in said piston for selectively directing fluid to either end of said cylinder and for directing exhaust fluid therefrom, the rod secured to said valve having an area on which exhaust pressure fluid is effective, said valve movable by a manual force applied to one of said rods, a piston secured to said reversing valve movable in said piston bore and having an area being acted on by exhaust pressure fluid, means for causing the force created by exhaust pressure fluid acting on said valve piston to be placed in opposition to said manual force; and means for venting the air in said piston cylinder bore to atmosphere.

5. A fluid pressure operated device comprising a cylinder, a piston in said cylinder having pressure fluid conducting passageways and a cylinder bore therein, a head for each end of said cylinder, a floating bushing in each head, a reversing valve in said piston, a tube extending through one of said bushings and connected to said piston for conducting fluid away from the piston, a tube connected to said reversing valve and movable by a manually applied force and extending through the other of said bushings for conducting fluid toward said piston, said tube having an area acted on by exhaust pressure fluid, said tube when moved adjusting said valve for cooperation with said passageways for selectively directing fluid to either end of said cylinder and for directing exhaust fluid therefrom, a piston associated with said reversing valve and movable in said cylinder bore and having an area acted on by exhaust pressure fluid; and means for causing the force created by the exhaust fluid selectively acting on said piston and on the tube for stopping fluid flow into said piston and to be placed in opposition to the manually applied force.

6. A fluid pressure operated device comprising a cylinder, a piston in said cylinder having pressure fluid passageways and a cylinder bore therein, a head for each end of said cylinder, a hollow piston rod extending through each bushing, each rod connected to said piston, means for admitting pressure fluid into said cylinder through one of said rods, a reversing valve connected to one of said rods and cooperating with the passageways in said piston for selectively directing fluid to either end of said cylinder and for directing exhaust fluid therefrom through the other rod, the rod connected to said valve having an area to be acted on by exhaust pressure fluid, said valve being movable by a force manually applied to said last mentioned rod, a piston associated with said reversing valve and movable in said bore; and means on said valve for enabling pressure fluid entering said piston to be balanced and the exhaust fluid that selectively acts on said piston or on the hollow rod through which pressure fluid enters said means creating a force so proportioned that the exhaust fluid tends to move said reversing valve to neutral position in opposition to said manually applied force after said rod is adjusted for selectively directing pressure fluid to either end of said cylinder.

7. A fluid pressure operated device comprising a cylinder, a piston slidably mounted in said cylinder and forming a chamber in each end of said cylinder, said piston having a bore therein and fluid conducting passageways and ducts extending through said piston in an axial direction, means for introducing pressure fluid into said piston, a reversing valve in said bore cooperating with said passageways for selectively directing pressure fluid into said chambers, a by-pass valve in each of said ducts, means for establishing communication between said valves and said bore for enabling pressure fluid to close said valves; and means for opening said by-pass valves upon failure of the fluid supply for permitting pressure fluid to freely move in said ducts thereby enabling said piston to be moved manually in said cylinder.

8. A fluid pressure operated device comprising a cylinder, a piston in said cylinder providing a chamber in each end thereof and having a pair of ducts therein extending axially therethrough, means for introducing pressure fluid derived from a source external to the device into said piston, means for selectively releasing pressure fluid from either of said chambers while the incoming pressure fluid acts in the other chamber, a valve for each duct, means for causing pressure fluid introduced into the piston to act on said valves for closing said ducts; and spring means for opening said valves upon failure of said pressure for enabling the fluid in said chambers to pass freely from one to the other when said piston is moved manually.

9. A fluid pressure operated device comprising a cylinder, a piston in said cylinder having pressure fluid conducting passageways therein, a head for each end of said cylinder, a reversing valve in said piston, a tube extending through one of said heads and connected to said piston for conducting fluid away from the piston, a tube connected to said reversing valve and movable by a manually applied force and extending through the other of said heads for conducting fluid toward said piston, said tube when moved adjusting said valve for cooperation with said passageways for selectively directing fluid to either end of said cylinder and for directing exhaust fluid therefrom; and means for causing the force created by the exhaust fluid to be placed in opposition to the manually applied force.

10. A fluid pressure operated device comprising a cylinder, a piston in said cylinder having a bore therein, a head for each end of said cylinder, a valve control rod and a piston rod connected to opposite ends of said piston extending through the head on each end of said cylinder, the control rod having an area on which exhaust pressure fluid is effective, a reversing valve connected to said control rod for selectively directing fluid to either side of said piston and for directing exhaust fluid from said cylinder and movable by a manually applied force; and a compensating piston connected to said valve and movable in the bore in said piston, said compensating piston in said bore having an effective area substantially equal to that of said control rod on which the exhaust pressure fluid is effective, means for venting air into and out of said bore as said compensating piston is moved therein, said compensating piston substantially balancing the forces created by said exhaust fluid acting on said compensating piston within said bore and in the control rod against said manually applied force.

References Cited in the file of this patent

UNITED STATES PATENTS

| Number | Name | Date |
| --- | --- | --- |
| 959,417 | Anderson | May 24, 1910 |
| 1,449,947 | Kiesel | Mar. 27, 1923 |
| 1,830,636 | Bragg | Nov. 3, 1931 |
| 1,864,225 | Williams | June 21, 1932 |
| 2,134,072 | Christensen | Oct. 25, 1938 |
| 2,349,804 | Sorensen | May 30, 1944 |
| 2,384,962 | Pohl | Sept. 18, 1945 |
| 2,393,585 | Boynton | Jan. 29, 1946 |
| 2,424,233 | Greenough | July 22, 1947 |
| 2,472,236 | Thomas | June 7, 1949 |
| 2,526,709 | Tait | Oct. 24, 1950 |
| 2,605,750 | Kupiec | Aug. 5, 1952 |